No. 669,486.  
H. C. PORTER.  
SECONDARY BATTERY.  
(Application filed Dec. 27, 1898.)  
Patented Mar. 5, 1901.
(No Model.)
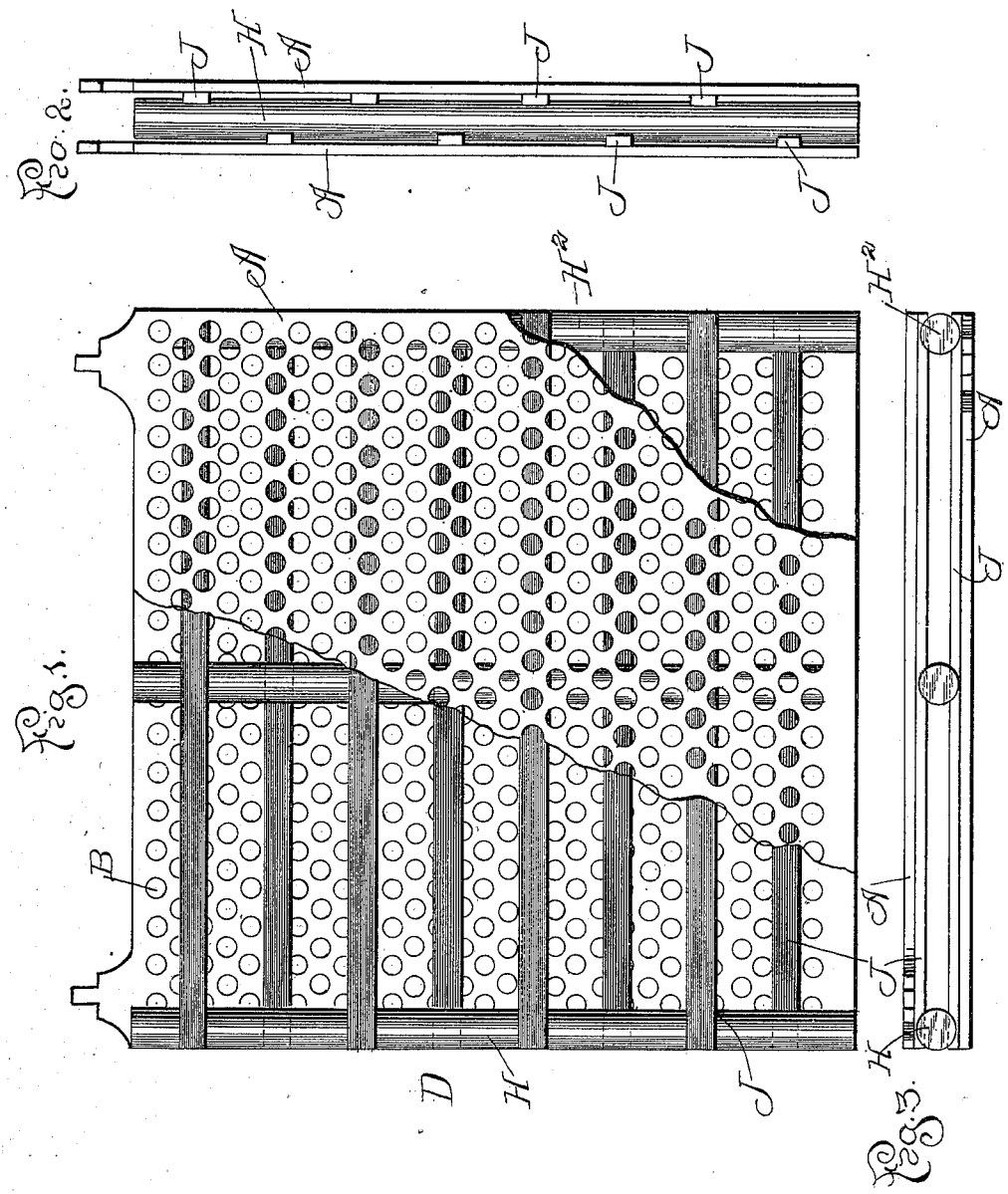

UNITED STATES PATENT OFFICE.

HENRY C. PORTER, OF CHICAGO, ILLINOIS, ASSIGNOR TO OWEN H. FAY, OF SAME PLACE.

SECONDARY BATTERY.

SPECIFICATION forming part of Letters Patent No. 669,486, dated March 5, 1901.

Application filed December 27, 1898. Serial No. 700,320. (No model.)

*To all whom it may concern:*

Be it known that I, HENRY C. PORTER, a citizen of the United States of America, and a resident of Chicago, Cook county, Illinois, have invented a certain new and useful Improvement in Secondary Batteries, of which the following is a specification.

My invention relates to certain improvements in secondary or storage batteries, by which the energy of an electric current is stored for future use.

In secondary or storage batteries electrodes or plates are employed of very many different types. Metallic lead plates are used, which plates are formed by the repeated and reversed charges of an electric current, known as the "Planté method of formation." In the other class of battery, known as the "Fauré type," the electrode consists of a grid or support of metallic lead, a lead oxid, or other suitable active material, or material to become active, mechanically applied to and supported by the grid. Under the influence of the charge and discharge of the electric current the electrodes or plates are constantly subjected to a strain which tends to warp and buckle the plates, causing short-circuiting and other disastrous results. It has been found necessary to employ means whereby to separate the electrodes one from the other and isolate them in such a way as to prevent the surfaces of the electrodes from coming in contact with each other to avoid short-circuiting and sulfation. In order to accomplish this result, very many forms of insulators have been employed, which insulators must be strong and durable and capable of withstanding the attacks of the acids in the electrolytic solution.

My invention has for its object the provision of an insulating-grid which is of maximum durability and which shall accomplish the result of complete isolation and separation of the electrodes one from another.

To this end my invention consists in certain features about to be described, and particularly pointed out in my claim, reference being now had to the accompanying drawings, in which—

Figure 1 is a side view of my improved insulator shown positioned between two electrodes, one of which is broken away. Fig. 2 is an end edge view of the same, and Fig. 3 is a plan edge view.

The electrodes are respectively designated at A and B and may be of any character or description as desired.

The insulator, which I have designated generally at D, consists of the vertical posts or rods H and $H^2$ of suitable insulating material. These posts, (three in number,) as shown, have notches cut at intervals to receive the horizontally-extending insulating-strips J. These strips are arranged on either side of the posts and are staggered relatively to each other, as shown more particularly in Fig. 2. With this form of construction I produce an insulator which is of extreme rigidity and of such character as to resist strain on all sides and also completely isolate the electrodes from one another.

It is important in this class of devices that the separator should not only be light in weight, as well as rigid in character; but as it is interposed between the battery-plates, which lie directly against it, it must afford a support for the active material upon the battery-plate and at the same time afford a ready means of egress for the gases which form during the action of the battery and which, if not permitted to immediately escape from the battery, will form bubbles on the battery-plates, thus lessening the surface of active material exposed to the electrolytic fluid and correspondingly reducing the efficiency of the battery. These requirements are all admirably answered by my battery-plate separator, as it will be seen by an inspection of the drawings, and particularly of Figs. 2 and 3, that as between the strips J on opposite sides of the rods H and $H^2$ there is a vertical channel from the bottom to the top of the battery-plates, which thus affords a permanently open flue through which the gases may escape and which sufficiently spreads the battery-plates to prevent short-circuiting, bridging, or treeing therebetween. The efficiency of the separator is greatly enhanced by having the strips J arranged in staggered relation on opposite sides of the posts, although such arrangement is not essential, as the channel would still be present if the strips were arranged exactly opposite each other.

Having thus described my invention, what I claim as new therein, and desire to secure by Letters Patent, is—

A battery-plate separator for storage batteries consisting of a plurality of vertical posts provided with notches, and a plurality of horizontal strips secured in the notches in each of the posts on the opposite sides thereof, said posts and strips being composed of insulating material, and said strips being staggered relatively to each other on opposite sides of the posts, substantially as described.

Signed by me at Chicago, Cook county, Illinois, this 21st day of November, 1898.

HENRY C. PORTER.

Witnesses:
CHAS. C. BULKLEY,
L. M. BULKLEY.